Jan. 1, 1963

P. J. GARDNER 3,070,968

LIQUID TO GAS CONVERSION SYSTEM

Filed Dec. 14, 1959

INVENTOR.
PAUL J. GARDNER
BY
ATTORNEY

United States Patent Office 3,070,968
Patented Jan. 1, 1963

3,070,968
LIQUID TO GAS CONVERSION SYSTEM
Paul J. Gardner, Davenport, Iowa, assignor to The
Bendix Corporation, a corporation of Delaware
Filed Dec. 14, 1959, Ser. No. 859,479
5 Claims. (Cl. 62—52)

This invention relates to a method and apparatus for converting a liquid to a gas having the gas constituents homogeneously mixed and more particularly to a method and apparatus for converting liquid oxygen and the contaminants dispersed therein into gaseous oxygen having the contaminants homogeneously dispersed therein.

Many gases which are to be used in the gaseous state are manufactured and placed in their liquid state for storage until use. These liquids will generally contain various contaminants in varying percentages which contaminants will appear regardless of the manufacturing processes and handling techniques used but may vary in concentration depending upon the techniques used. The contaminants may be present in solution or in the liquid or solid form.

Generally the presence of the contaminants in the liquid, and then in the gas, is in such a percentage that they are not harmful if homogeneously mixed. This is also true with oxygen when the gas is used for breathing purposes. The contaminants can not be concentrated but must be homogeneously dispersed in the oxygen gas.

Present oxygen systems in which the liquid is converted to a gas for breathing purposes employ a vacuum insulated vessel for storing the liquid oxygen. The liquid oxygen stored in the pressure vessel contains noxious contaminants, these contaminants are primarily ethane, methane, and carbon dioxide. Upon demand or a use requirement the liquid oxygen passes through a heat exchanger where the oxygen transfers into the gaseous phase suitable for breathing purposes. The contaminants are not harmful if they are vaporized and appear homogeneously in the breathing oxygen. Due to the boiling points of the liquid oxygen and the contaminant and the user's cyclic demand, the methods and apparatus employed in existing conversion systems do not produce a homogeneous gas; the contaminants are present in the gas stream in concentrated "slugs."

The invention has as one of its objects the provision of a method and apparatus for liquid to gas conversion whereby the contaminants present in the liquid are homogeneously distributed in the gas.

The liquid to gas conversion of oxygen is presently accomplished by means of a heat exchanger. The space requirements in the modern-day aircraft require that the heat exchanger take up a limited area. The heat exchangers now in use take the form of coiled tubing or expanded tube sheet, in such configurations as the space allows and of such length as required by the maximum oxygen flow. For high oxygen flows the liquid oxygen will fill a large portion of the tubing and for low flows the liquid oxygen will fill only a small portion of the tubing, the vaporization point or transition area will therefore vary depending upon the oxygen demand requirement; for low flows the vaporization point will be fairly close to the liquid supply and for higher flows will extend proportionately farther out in the tubing. In the operation of the oxygen conversion system the contaminants, having higher boiling points than the liquid oxygen, will be deposited as solid or liquids at the end of the liquid oxygen carrying stream, the transition area, since their boiling points are significantly warmer than the oxygen vapor at the transition area. This deposition is, in part, fractional distillation. A reduced demand for oxygen will cause the liquid oxygen in the heat exchanger tubing to recede by vaporization toward the liquid oxygen supply. The high demand transition area is warmed whereby the contaminants which have been accumulating during the high demand will vaporize and cause a concentrated supply or "slugging" of the noxious contaminants to the user.

Another object of the invention is to provide a method and apparatus whereby the higher boiling point constituents of liquid oxygen are introduced into the vaporized gas stream to produce a homogeneous gas.

Another object of the invention is to provide a method and apparatus whereby the higher boiling point constituents of liquid oxygen are separated from the liquid and then introduced into the vaporized oxygen gas stream at a temperature above the boiling points of all constituents to produce a homogeneous gas.

A further object of the invention is to provide a method and apparatus for settling out the higher boiling point constituents of liquid oxygen and to aspirate the constituents into the oxygen gas stream to produce a homogeneous gas.

A still further object of the invention is to provide a method and apparatus for settling out the higher boiling point constituents of liquid oxygen and to restrict and control the gravitational flow of the constituents into the gas stream to produce a homogeneous gas.

Certain of these objects and advantages are realized in the invention by the provision of means for separating the higher boiling point constituents of liquid oxygen and means for introducing the constituents into the oxygen gas stream at a controlled rate.

The foregoing and other objects and advantages of the invention will appear more fully hereinafter from a consideration of the detailed description which follows; taken together with the accompanying drawing wherein an embodiment and modification thereof of the invention are illustrated. It is to be expressly understood, however, that the drawing is for the purposes of illustration and description and is not to be construed as defining the limits of the invention.

Figure 1:
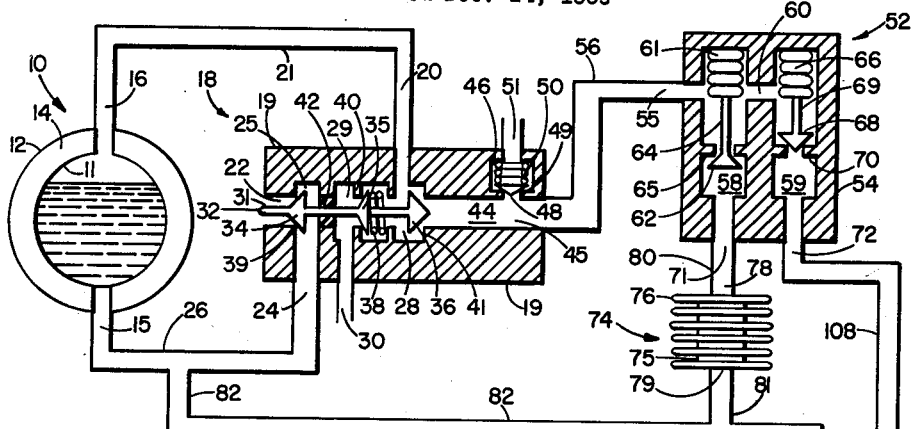
FIG. 1 is a schematic drawing of a liquid to gas conversion system embodying the inventive conversion apparatus.

Referring now to the drawing and FIG. 1, numeral 10 designates a liquid oxygen container having an inner wall 11 and an outer wall 12 forming evacuated chamber 14. Liquid port 15 is disposed at the bottom of the container 10 and gas port 16 is disposed at the top of container 10.

Fill, build-up, vent, and relief valve 18 has valve housing 19 having gas outlet port 20 connected to gas port 16 of container 10 by means of tubing 21. Valve housing 19 defines liquid fill port 22 and liquid outlet port 24 which are connected by means of fill chamber 25. Liquid outlet port 24 is in communication with liquid port 15 of container 10 by means of tubing 26. Valve housing 19 further defines communicating build-up chamber 28 and gas vent chamber 29 which are in direct communication with gas port 20 and with gas vent 30, respectively. Valve stem 31 is disposed in liquid fill port 22 and extends through fill chamber 25, vent chamber 29 and build-up chamber 28. End 32 of stem 31 may be suitably designed for mating connection with any one of several suitable liquid oxygen fill nozzles. Fill valve head 34, vent valve head 35, and build-up valve head 36 are jointed to and movable with stem 31. Valve stem 31 is biased in the build-up position (as shown) by means of spring 38; fill valve head 34 seats on valve seat 39 and liquid fill port 22 is closed off from fill chamber 25; vent valve head 35 seats on valve seat 40 and liquid vent chamber 29 is closed off from build-up chamber 28; build-up valve head 36 is off of valve seat 41. Fill chamber 25 is separated from vent chamber 29 by means of resilient seal 42. Valve housing 19 defines passageway 44 which is in direct communication with gas outlet port 20 and gas inlet port 45. Relief valve chamber 46 defined by housing 19 is in direct communication with passageway 44 and is intermediate said gas outlet port 20 and gas inlet port 45. Relief valve head 48 is biased toward seat 49 by means of spring 50 to close off relief valve chamber 46 from passageway 44. Relief valve chamber 46 is in direct communication with exhaust port 51 which vents to the atmosphere.

Pressure opening and closing valve 52 has a housing 54 having outlet port 55. Outlet port 55 is in direct communication with gas inlet port 45 of fill, build-up, vent, and relief valve 18 by means of tubing 56. Housing 54 defines pressure closing chamber 58 and pressure opening chamber 59 which are in direct communication by means of passageway 60. Outlet port 55 leads directly into pressure closing chamber 58. Pressure closing bellows 61 is disposed in pressure closing chamber 58 and is joined at one end to the wall of chamber 58. Pressure closing valve head 62 is connected to the second end of bellows 61 by means of valve stem 64, and biased away from pressure closing valve seat 65 by bellows 61. Pressure opening bellows 66 is disposed in pressure opening chamber 59 and is joined at one end to the wall of chamber 58. Pressure opening valve head 68 is connected to the second end of bellows 66 by means of valve stem 69 and biased from pressure opening valve seat 70 by bellows 66. Housing 54 defines pressure closing inlet 71 which is in direct communication with pressure closing chamber 58. Housing 54 defines pressure opening outlet 72 which is in direct communication with pressure opening chamber 59.

The numeral 74 designates a heat exchanger which comprises warming cylinder 75 encompassed by a plurality of warming fins 76. Heat exchanger 74 has gas outlet 78 on the top of warming cylinder 75 and liquid inlet 79 at the bottom. Gas outlet 78 is in direct communication with pressure closing inlet 71 of pressure opening and closing valve 52 by means of tubing 80. Liquid inlet 79 is in direct communication with liquid port 15 of liquid oxygen container 10 by means of supply tubing 81 and 82. Advantageously heat exchanger 74 is disposed in the system as a "feed through stand pipe" to preclude the trapping of contaminants in the build-up line 80 and to prevent the possibility of liquid flowing in pressure opening and closing valve 52.

Numeral 84 designates a flash boiler having a housing 85. Vertical heat exchanger 86 comprises evaporating cylinder 88 encompassed by a plurality of warming fins 89 and is disposed in housing 85 and held in place by means of support 90. Supply tubing 91 is in direct communication with supply tubing 82 and terminates in nozzle 92 disposed in evaporating cylinder 88 for fluid dispersement thereagainst. Advantageously, nozzle 92 is disposed for dispersing fluid against the wall of evaporating cylinder 88 which results in evaporation of the fluid from nozzle 92. Calibrated orifice 94 is disposed in evaporating cylinder 88 for controlling the liquid flow therethrough from nozzle 92. Mixing chamber 95 is joined to the lower end of evaporating cylinder 88 gas warming line 96 is joined to the upper end of evaporating cylinder 88 and is helically wound around warming fins 89 and terminates at the lower end of heat exchanger 86 in mixing chamber 95.

The lower end of housing 85 forms warming chamber 98 originating in air inlet 99 disposed for connection to forced air supply line 100 and a suitable forced warm air source 101. When the oxygen system is to be used in a jet aircraft this source may advantageously be either ram bleed air or compressor bleed air and warmer than the highest boiling point constituent to be vaporized. Warm air entering air inlet 99 passes through warming chamber 98 around warming fins 89 and gas warming line 96 to forced air outlet 102 at the top of housing 85.

Outlet 104 of mixing chamber 95 is connected to main gas supply line 105, supply line 105 passes through warming chamber 98 and terminates in gas regulating device 106. Pressure opening outlet 72 is connected to gas supply line 108 which is joined with supply line 105 at T connection 109.

Intermediate the gas regulating device 106 and mixing chamber 95 is disposed check and relief valve 110 having a housing 111. Housing 111 defines check valve chamber 112, inlet 114 and outlet 115. Inlet 114 and outlet 115 are connected to supply line 105 and in fluid communication with check valve chamber 112. Valve head 116 is disposed in chamber 112 and biased toward valve seat 118 by means of spring 119 to close off check valve chamber 112 from inlet 114. Housing 111 defines communicating relief valve inlet 120, relief valve chamber 121 and relief valve outlet 122. Relief valve inlet 120 is in direct communication with check valve chamber 112. Valve head 125 is biased toward valve seat 126 by means of spring 128 to close off relief valve chamber 112 from outlet 122.

Figure 2:
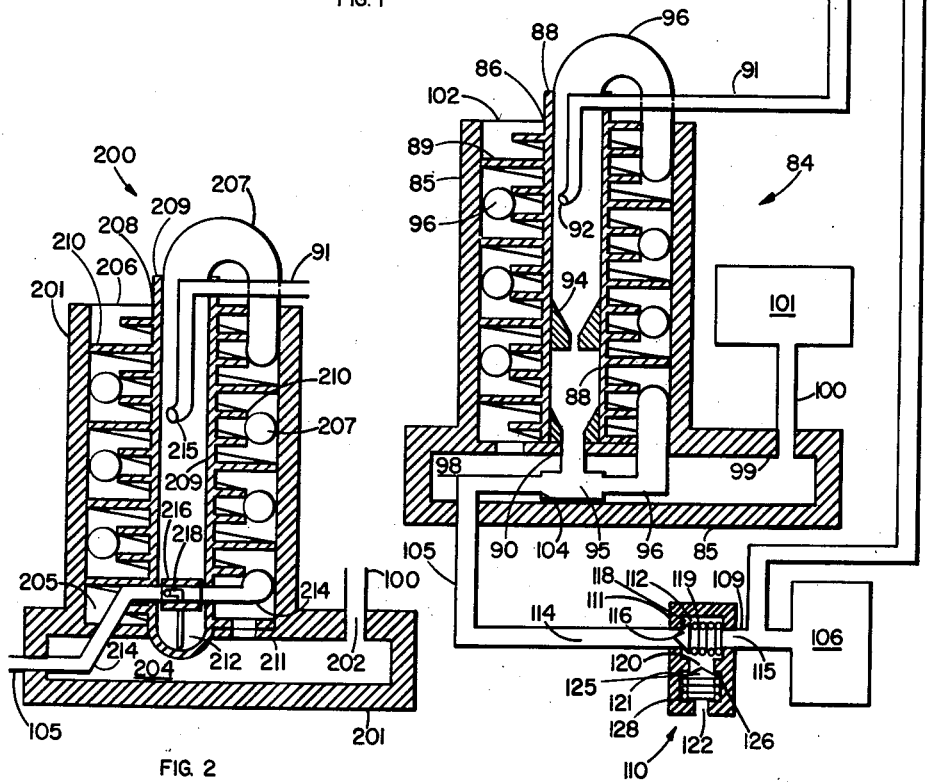
FIG. 2 is a schematic drawing of a modification of the inventive conversion apparatus shown in FIG. 1.

Referring now to FIG. 2 of the drawing, there is shown a portion of the liquid to gas conversion system shown in FIG. 1. Numeral 200 designates a flash boiler which is a modification of the flash boiler 84 shown in FIG. 1.

Flash boiler 200 has a housing 201 which defines communicating forced air inlet 202, warming chamber 204, heat exchanger chamber 205 and forced air outlet 206. Forced air inlet 202 is connected to forced air supply line 100. Vertical heat exchanger 208 comprises evaporating cylinder 209 encompassed by a plurality of warming fins 210 and is disposed in heat exchanger chamber 205 and rigidly held by means of support 211. The lower end of evaporating cylinder 209 forms a fluid collection chamber 212. The upper end of evaporating cylinder 209 is in fluid communication with gas warming line 207 which is helically wound around warming fins 210 and passes through evaporating cylinder 209 as gas supply line 214. Supply tubing 91 terminates in nozzle 215 and is disposed in evaporating cylinder 209. Advantageously nozzle 215 sprays fluid against the wall of evaporating cylinder 209 which results in rapid evaporation of the fluid from nozzle 215.

Gas supply line 214 passes into the lower end of evaporating cylinder 209 and is in fluid communication with aspirating chamber 216. Main gas supply line 105 is in fluid communication with aspirating chamber 216 and passes out of evaporating cylinder 209 and through warming chamber 204. Aspirator 218 has one end thereof disposed in fluid collection chamber 212 and the other end disposed in aspirating chamber 216.

In operation of the liquid to gas conversion system shown in FIG. 1 when the system is to be used to supply breathing oxygen, liquid fill port 22 is connected to a suitable connector from a liquid supply. The connector from the liquid supply biases against valve stem 32 and moves fill valve head 34 off of seat 39, vent valve head 35 off of seat 40 and build-up valve head 36 against seat 41. Fill, build-up, vent, and relief valve 18 is not in the "fill" position and the top of liquid oxygen container 10 is vented to the atmosphere through gas port 16, tubing 21, gas outlet port 20, build-up chamber 28, gas vent chamber 29 and gas vent 30. Liquid oxygen passes through inlet 22, fill chamber 25, liquid outlet port 24, tubing 26, and through liquid port 15 to fill liquid oxygen container 10. As the container 10 is filled with liquid, vaporized gas is vented through gas port 16 and to the atmosphere through gas vent 30. When the container 10 is full, liquid will pass out gas vent 30 and the connector can be removed from liquid fill port 22. Spring 38 biases fill valve head against seat 40 and build-up valve head 36 off of seat 41. Fill, build-up, vent, and relief valve 18 is now in the build-up position.

The liquid oxygen as supplied at liquid fill port 22 will contain numerous contaminants. These contaminants will appear regardless of the techniques used in the production of the liquid oxygen and of the handling methods used. The level of these contaminants varies depending upon the control of the manufacturing process and the control of the handling equipment and transfer techniques. The primary contaminants found in the liquid oxygen are methane, carbon dioxide, nitrous oxide, and some multi-carbon hydrocarbons which are either noxious or toxic if inhaled in modest quantity or under adverse conditions. These contaminants have a higher boiling point than the liquid oxygen in which they are dispersed.

For the purpose of illustrating the operation of the novel liquid to gas conversion system, various pressures will be used. These pressures are not to be construed to define the limits of the invention, a wide range of pressures may be used which are within the scope of the novel liquid to gas conversion system.

With fill, build-up, vent, and relief valve 18 in the "build-up" position, there is direct external communication between the liquid and gaseous phases in liquid oxygen container 10 by means of tubing 26, 82, and 81, heat exchanger 74, tubing 80, pressure opening and closing valve 52, tubing 56, valve 18, and tubing 21. Through the force of gravity, liquid passes through liquid port 15 of container 10 and into heat exchanger 74 and flash boiler 84 by means of tubing 26, 82, 81, and 91. The liquid is vaporized in heat exchanger 74 and passes to the top of container 10 through gas port 16 by means of tubing 80, valve 52, tubing 56, valve 18, and tubing 21, the liquid in flash boiler 84 is vaporized and dispersed throughout the system. The increased volume of the gaseous oxygen in the system causes a pressure rise in the system which continues until a preset pressure of 75 p.s.i.g. is reached. At 75 p.s.i.g. the pressure closing valve of pressure opening and closing valve 52 will close as a result of the pressure collapsing pressure closing bellows 61, thus valve head 62 is biased against valve seat 65. With pressure closing valve closed there is no further external communication between the liquid and gaseous phases of the liquid oxygen container 10 and liquid cannot enter the heat exchanger 74 for vaporization.

The liquid to gas conversion system is ready to supply oxygen gas to regulating device 106 when the pressure in the liquid oxygen converter 10 is at or above 75 p.s.i.g. The check valve portion of check and relief valve 110 is set to operate on a 5 p.s.i.g. pressure differential across valve 116. When the pressure in check valve chamber 112 drops to 5 p.s.i.g. below the pressure at inlet 114, the inlet pressure will overcome the pressure in chamber 112 and the bias of spring 114 and valve head 116 will move off of valve seat 118 allowing gas to flow to gas regulating device 106 by means of supply line 105.

When there is no gas demand by the gas regulating device 106 pressure will continue to build up in the system as the liquid is vaporized in liquid oxygen container 11, tubing 82 and 91, and in flash boiler 84. When the pressure in the system rises above 80 p.s.i.g. normally closed pressure opening valve of pressure opening and closing 52 will open as the pressure in pressure opening chamber 59 collapses bellows 66 which moves valve head 68 off of valve seat 70. The economy circuit (container 10, tubing 21, valve 18, tubing 56, valve 52, and tubing 108) is now open which provides a direct gas flow passage from the top of container 10 to gas regulating device 106. The gas pressure in the system will continue to build up until a gas pressure of 110 p.s.i.g. is reached when the relief valve portion of check and relief valve 110 and the relief valve portion of fill, build-up, vent, and relief valve 18 will vent the gas to the ambient air and maintain the pressure in the system at a maximum of 110 p.s.i.g. The relief valve portion of valve 18 will open when the pressure in passageway 44 acting on valve head 48 overcomes the bias of spring 50 and pressure in chamber 46. The relief valve portion of valve 110 will open when the pressure in chamber 112 acting on valve head 125 overcomes the bias of spring 128 and pressure in chamber 121.

An oxygen demand, as sensed by the regulating device 106 when the pressure in the system is between 80 and 110 p.s.i.g., will not alter the steady state of the system. The oxygen supplied will be the oxygen as represented by the pressure in excess of 80 p.s.i.g. The large percentage of the gas supplied to regulator 108 when the pressure in the system is between 80 and 110 p.s.i.g. comes from the liquid evaporated in the container 10. Since this gas comes directly from the container 10 to the regulating device 106 by means of tubing 21, valve 18, tubing 56, valve 52, tubing 108 and 105 it will be substantially free from contaminant concentration. The temperature in container 10 is not high enough to vaporize the higher boiling point contaminant constituents of liquid oxygen.

When the pressure in the system drops to 80 p.s.i.g. the pressure opening portion of pressure opening and closing valve 52 will close. As the demand for oxygen continues the pressure in chamber 112 of check and relief valve 110 drops to 75 p.s.i.g. at which point valve head 116 moves off of seat 118.

The decrease of pressure is reflected back in line 82 and liquid oxygen will flow through tubing 91 and into evaporating cylinder 88 where most or all of the oxygen will be vaporized. If there is a very low flow rate all of the liquid including the contaminants will vaporize and pass out of evaporating cylinder 88 into gas warming line 96, through mixing chamber 95 and supply line 105 to regulating device 106. At the higher flow rates only part of the liquid is vaporized in evaporating cylinder 88. The remaining liquid which contains most of the contaminants and liquid oxygen which is the contaminant carrying liquid will drop to the bottom of the chamber and will pass through restricted orifice 94 and through the high heat input area below orifice 95 and into mixing chamber 95. The liquid as it passes through the high heat input area will vaporize. In mixing chamber 95 the vaporized contaminants and the warmed, substantially contaminant free gaseous oxygen, which is fed into mixing chamber 95 from gas warming line 96 are mixed in substantially their original proportions as found in the liquid state and are supplied to the gas regulating device 106.

Heat for vaporizing the liquid oxygen comes from warm air source 101 and is introduced into flash boiler 84 at air inlet 99. The air passes over mixing chamber 95 and up through the housing 85 of flash boiler 84. The heat is transferred from the air to the warming fins 89 and into evaporating cylinder 88. Heat is also transferred to the helically wound warming line 96 which carries the vaporized oxygen. Enough warm air must be used to insure that the gas in warming chamber 95 is at a temperature above the flash point of all potentially harmful contaminants in the liquid oxygen supply.

Advantageously tubing 81, 82, and 91 are made of low conductivity material. Tubing 82 and 91 is made this way to reduce the possibility of any liquid boiling at low flows prior to reaching evaporating cylinder 88. Tubing 81 is designed to insure that a small vertical column will always exist at the inlet to the "build-up" circuit.

During periods when the pressure closing valve portion of pressure opening and closing valve 52 is open the liquid level in tubing 81 will rise into a high heat conductivity area of heat exchanger 74 where liquid oxygen and some of the contaminants will be vaporized and flow through the pressure closing valve to the top of liquid oxygen container 10. The balance of the non-vaporized contaminants will subsequently recede with the liquid column and mix with the liquid oxygen flowing through tubing 82. Therefore, there will be no build-up of contaminants which at some point in use will "flash off" and provide a high concentration of contaminants to the regulating device 106.

The operation of the liquid to gas conversion system of FIG. 1 is the same with the inclusion of the flash boiler shown in FIG. 2 except for the reintroduction into the gas stream of the separated contaminants by aspiration rather than a vertical drip column. When there is a small requirement for gas by regulating device 106, and thus a small liquid flow into evaporating cylinder 209, all of the liquid including the contaminants will vaporize and pass out of evaporating cylinder 209 into gas warming line 207, through aspirating chamber 216 and supply line 105 to regulating device 106. At the higher flow rates only part of the liquid entering evaporating cylinder 209 will be vaporized. The remaining liquid which contains most of the contaminants and liquid oxygen which is the contaminant carrying liquid will fall into collection chamber 212. The liquid collected in chamber 212 is aspirated out of the chamber 212 by means of the warm gas flowing through aspirating chamber 216 and aspirator 218. In aspirating chamber 216 the aspirated liquid is vaporized and mixed with the warmed substantially free gaseous oxygen, which is fed into aspirating chamber 216 from gas warming line 207, in substantially the original proportions as found in the liquid state in liquid oxygen container 10. The mixed gas flows from aspirating chamber 216 through supply line 105 to regulating device 106.

While the liquid to gas conversion system as shown in the drawing is of the construction shown and described, it is understood that the instant invention is not limited to any particular form or construction. Moreover, other changes and modifications of the novel liquid to gas conversion system contemplated herein may be made by those skilled in the art without departing from the scope of the instant invention.

I claim:

1. A liquid to gas conversion unit for a multiconstituent liquid comprising an evaporating chamber, means for introducing liquid into said chamber at a rate commensurate with a gaseous demand, a plurality of warming fins encompassing said evaporating chamber and in heat conducting relation therewith, a gas warming line in fluid communication with said evaporating chamber and disposed to pass through said warming fins and means for introducing into said warming line any unevaporated constituent from said evaporating chamber.

2. A flash boiler for use with a liquid to gas conversion system wherein the liquid is a multi-constituent liquid, comprising an evaporating chamber having a restricted passage disposed therein, means for introducing liquid into said chamber at a rate commensurate with a gaseous demand, a plurality of warming fins encompassing said evaporating chamber and in heat conducting relation therewith, a gas warming line in fluid communication with said evaporating chamber and disposed to pass through said warming fins and means for introducing into said gas warming line any constituents from said evaporating chamber which have passed through said restricted passage.

3. A liquid oxygen to gaseous oxygen conversion system where the contaminants dispersed in the liquid oxygen are homogeneously distributed in the gaseous oxygen comprising, a liquid oxygen storage vessel, a flash boiler comprising a housing having a vertical open cylindrical section and a warm air inlet section, an evaporating chamber disposed in said housing and axially aligned with said cylindrical section having a restricted passage disposed therein dividing said evaporating chamber into a first evaporating chamber and a second evaporating chamber, a plurality of substantially radial warming fins encompassing said evaporating chamber and in heat conducting relation therewith, a gaseous oxygen warming line in fluid communication with said first evaporating chamber and coiled through said warming fins terminating in fluid communication with said second evaporating chamber, means for withdrawing said liquid oxygen from said storage vessel and injecting said liquid oxygen into said first evaporating chamber at a rate commensurate with the gaseous oxygen demand, means for introducing into said gaseous oxygen warming line any oxygen and contaminants from said second evaporating chamber which have passed through said restricted passage and warm air supply means for continuously passing warm air through said open cylindrical section and said warm air inlet section.

4. A flash boiler for use with a liquid to gas conversion system wherein the liquid is a multi-constituent liquid comprising an evaporating chamber having one end thereof forming a collection chamber, means for introducing liquid into said evaporating chamber at a rate commensurate with a gaseous demand, a plurality of warming fins encompassing said evaporating chamber and in heat conducting relation therewith, a gas warming line in fluid communication with said evaporating chamber and disposed to pass through said warming fins and means for aspirating into said gas warming line any unevaporated constituents from said evaporating chamber which are deposited in said collection chamber.

5. An oxygen conversion system wherein the contaminants dispersed in the liquid oxygen are homogeneously distributed in the gaseous oxygen comprising a liquid oxygen storage vessel, a flash boiler comprising a housing having a vertical open cylindrical section, and a warm air inlet section, an evaporating chamber disposed in said housing and axially aligned with said cylindrical section, having one end thereof forming a collection chamber, a plurality of substantially radial warming fins encompassing said evaporating chamber and in heat conducting relation therewith, a gaseous oxygen warming line in fluid communication with said evaporation chamber and coiled through said warming fins and disposed to pass through said collection chamber, means for withdrawing liquid oxygen from said storage vessel and injecting said liquid oxygen into said evaporating chamber at a rate commensurate with the gaseous oxygen demand, aspirating means having one end disposed in said collection chamber and a second end disposed in said gaseous oxygen warming line for aspirating the liquid oxygen and contaminants in said collection chamber into said warming line and warm air supply means for continuously passing warm air through said open cylindrical section and said warm air inlet section.

References Cited in the file of this patent

UNITED STATES PATENTS

| | | |
|---|---|---|
| 1,752,166 | Ford | Mar. 25, 1930 |
| 1,899,378 | Zouck | Feb. 28, 1933 |
| 2,182,684 | Venable | Dec. 5, 1939 |
| 2,403,220 | Hintze | July 2, 1946 |
| 2,456,889 | Olson | Dec. 21, 1948 |
| 2,671,324 | Trumpler | Mar. 9, 1954 |
| 2,729,948 | Northgraves | Jan. 10, 1956 |
| 2,824,428 | Yendall | Feb. 25, 1958 |

FOREIGN PATENTS

| | | |
|---|---|---|
| 4,694 | Great Britain | Feb. 25, 1904 |
| 385,238 | Germany | Nov. 24, 1920 |
| 705,621 | France | June 10, 1931 |
| 794,836 | Great Britain | May 14, 1958 |